US012619980B2

(12) United States Patent
Mu et al.

(10) Patent No.: US 12,619,980 B2
(45) Date of Patent: May 5, 2026

(54) SECURITY AUTHENTICATION METHOD, APPARATUS AND SYSTEM FOR DIGITAL CURRENCY TRANSACTION

(71) Applicant: Digital Currency Institute, The People's Bank of China, Beijing (CN)

(72) Inventors: Changchun Mu, Beijing (CN); Gang Di, Beijing (CN); Xinyu Zhao, Beijing (CN); Wei Liang, Beijing (CN); Peidong Cui, Beijing (CN); Kefeng Xu, Beijing (CN); Yongchao Bian, Beijing (CN)

(73) Assignee: Digital Currency Institute, The People's Bank of China, Beijing (CN)

( * ) Notice: Subject to any disclaimer, the term of this patent is extended or adjusted under 35 U.S.C. 154(b) by 0 days.

(21) Appl. No.: 18/840,068

(22) PCT Filed: Feb. 24, 2023

(86) PCT No.: PCT/CN2023/078254
§ 371 (c)(1),
(2) Date: Aug. 20, 2024

(87) PCT Pub. No.: WO2023/160667
PCT Pub. Date: Aug. 31, 2023

(65) Prior Publication Data
US 2025/0156860 A1 May 15, 2025

(30) Foreign Application Priority Data
Feb. 24, 2022 (CN) .......................... 202210173203.5

(51) Int. Cl.
*G06Q 20/38* (2012.01)
*G06Q 20/06* (2012.01)
(Continued)

(52) U.S. Cl.
CPC ....... *G06Q 20/3823* (2013.01); *G06Q 20/065* (2013.01); *G06Q 20/38215* (2013.01);
(Continued)

(58) Field of Classification Search
CPC ............. G06Q 20/3823; G06Q 20/065; G06Q 20/38215; G06Q 20/3825; G06Q 20/3829;
(Continued)

(56) References Cited

U.S. PATENT DOCUMENTS

2016/0254918 A1 9/2016 Liu et al.
2023/0177505 A1* 6/2023 Cheng .................... G06Q 20/36
705/75

FOREIGN PATENT DOCUMENTS

CN 107230052 A 10/2017
CN 107230072 A 10/2017
(Continued)

OTHER PUBLICATIONS

Belchior et al. "A Survey on Blockchain Interoperability: Past, Present and Future Trends", arXiv:2005.14282v3, Mar. 22, 2021, 63 pages (Year: 2021).*

(Continued)

*Primary Examiner* — James D Nigh
(74) *Attorney, Agent, or Firm* — Wolf, Greenfield & Sacks, P.C.

(57) ABSTRACT

The present application relates to the technical field of computers. A security authentication method, apparatus and system for a digital currency transaction. A specific embodiment of the method includes: a first terminal device storing a first certificate issued by a digital currency issuing end and second certificates issued by one or more digital currency operation ends; the first terminal device receiving a third certificate sent by a first digital currency operation end, and
(Continued)

Digital currency issuer | Digital currency operator | First terminal device

S201:The digital currency issuer sends a first certificate to the digital currency operator S202:The digital currency issuer sends the first certificate to the first terminal device S203:The digital currency operator sends institution data of the digital currency operator to the digital currency issuer S204:The digital currency issuer sends a second certificate to the digital currency operator S205:The digital currency operator sends the second certificate of the institution to the first terminal device S206:The first terminal device sends signature data of local data of the first terminal device to the digital currency operator S207:The digital currency operator issues a third certificate of the first terminal device to the first terminal device S208:The digital currency operator and the first terminal device generate a process key to encrypt transmitted data performing signature verification on the third certificate by using a second certificate, which is issued by the first digital currency operation end and passes signature verification; and after the third certificate passes the signature verification, the first terminal device performing a digital currency transaction with the first digital currency operation end and/or a second terminal device, wherein the second terminal device stores a fourth certificate sent by a second digital currency operation end. By means of the embodiment, mutual authentication and secure communication between a digital currency operation end and a terminal device and between different terminal devices can be realized, thereby avoiding potential security hazards such as information stealing, information leakage and illegitimate access.

20 Claims, 5 Drawing Sheets

(51) Int. Cl.

| | | |
|---|---|---|
| *G06Q 40/04* | (2012.01) | |
| *H04L 9/00* | (2022.01) | |
| *H04L 9/06* | (2006.01) | |
| *H04L 9/08* | (2006.01) | |
| *H04L 9/32* | (2006.01) | |
| *H04L 9/40* | (2022.01) | |

(52) U.S. Cl.
CPC ..... *G06Q 20/3825* (2013.01); *G06Q 20/3829* (2013.01); *G06Q 40/04* (2013.01); *H04L 9/0662* (2013.01); *H04L 9/0838* (2013.01); *H04L 9/3247* (2013.01); *H04L 9/3263* (2013.01); *H04L 9/50* (2022.05); *H04L 63/0428* (2013.01); *H04L 63/0823* (2013.01)

(58) Field of Classification Search
CPC ..... G06Q 40/04; H04L 9/0662; H04L 9/3247; H04L 9/3263; H04L 9/50; H04L 9/0838; H04L 63/0428; H04L 63/0823
USPC .......................................... 705/71
See application file for complete search history.

(56) References Cited

FOREIGN PATENT DOCUMENTS

| | | | | | |
|---|---|---|---|---|---|
| CN | 107392601 | A | 11/2017 | | |
| CN | 107959686 | A | 4/2018 | | |
| CN | 109302412 | A | 2/2019 | | |
| CN | 112291190 | A | 1/2021 | | |
| CN | 113065856 | A | 7/2021 | | |
| CN | 114037446 | A | 2/2022 | | |
| CN | 114584355 | A | 6/2022 | | |
| CN | 114037446 | B | * 4/2025 | ............ | G06Q 40/04 |
| WO | WO 2017/182601 | A1 | 10/2017 | | |

OTHER PUBLICATIONS

First Office Action for Chinese Application No. 202210173203.5, dated Apr. 23, 2023.

International Search Report and Written Opinion for International Application No. PCT/CN2023/078254, mailed Jun. 8, 2023.

Extended European Search Report for European Application No. 23759289.4, dated Feb. 9, 2026.

[No. Author Listed], X.509. Wikipedia. Retrieved from the Internet: (https://en.wikipedia. org/w/index.php?title=X.509 &oldid= 916432550), Sep. 2019 [Last retrieved Apr. 25, 2022], 15 pages.

[No. Author Listed], Zero Trust and a New ZT Cryptosystem: Verify, Validated and Authenticate. Wayback machine, Jan. 16, 2019, [last retrieved Mar. 17, 2025]; 15 pages.

Christodorescu et al., Towards a Two-Tier Hierarchical Infrastructure: An Offline Payment System for Central Bank Digital Currencies. arXiv preprint arXiv:2012.08003; Dec. 14, 2020, 21 pages.

Hardjono, Attestation Infrastructures for Private Wallets. arXiv preprint arXiv:2102.12473. Feb. 24, 2021. 9 pages.

O'Mahiny et al., Electronic Payment Systems for E-Commerce. Second Edition. Computer Security Series, 2001:360 pages.

Wüst et al., Platypus: A Central Bank Digital Currency with Unlinkable Transactions and Privacy Preserving Regulation. International Association for Cryptologic Research. Oct. 2, 20217;20211027:193458:1-18.

* cited by examiner

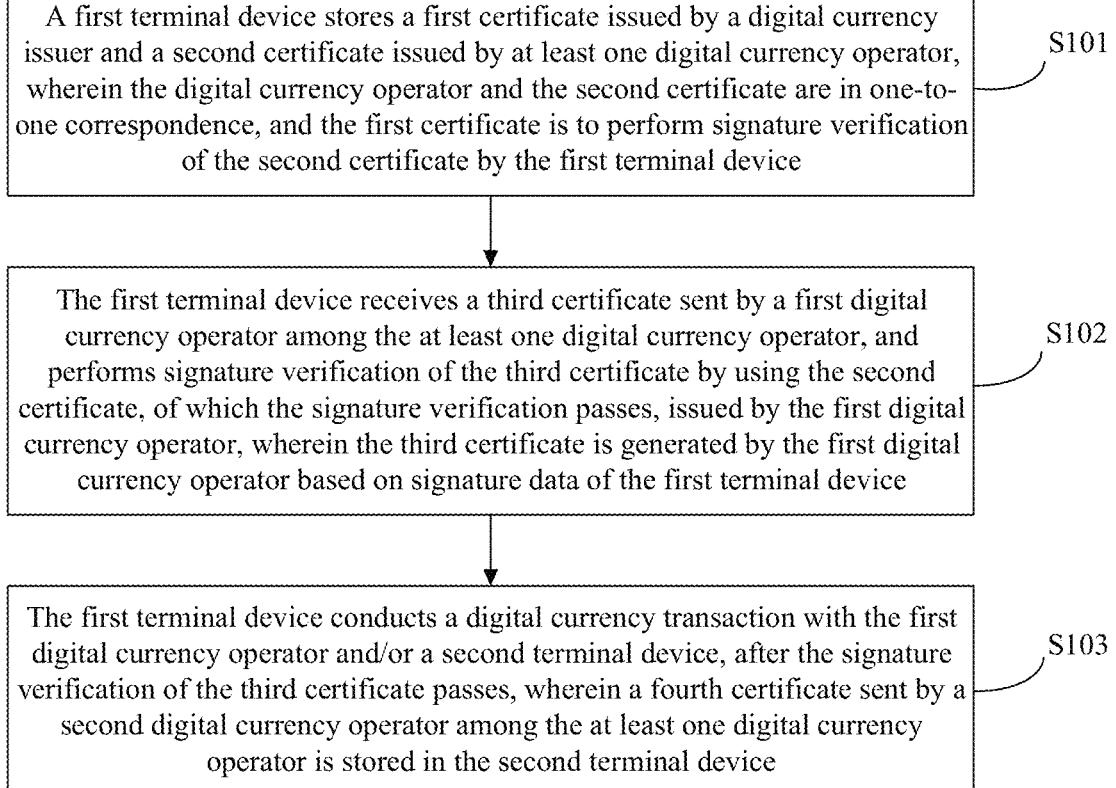

A first terminal device stores a first certificate issued by a digital currency issuer and a second certificate issued by at least one digital currency operator, wherein the digital currency operator and the second certificate are in one-to-one correspondence, and the first certificate is to perform signature verification of the second certificate by the first terminal device

S101

The first terminal device receives a third certificate sent by a first digital currency operator among the at least one digital currency operator, and performs signature verification of the third certificate by using the second certificate, of which the signature verification passes, issued by the first digital currency operator, wherein the third certificate is generated by the first digital currency operator based on signature data of the first terminal device

S102

The first terminal device conducts a digital currency transaction with the first digital currency operator and/or a second terminal device, after the signature verification of the third certificate passes, wherein a fourth certificate sent by a second digital currency operator among the at least one digital currency operator is stored in the second terminal device

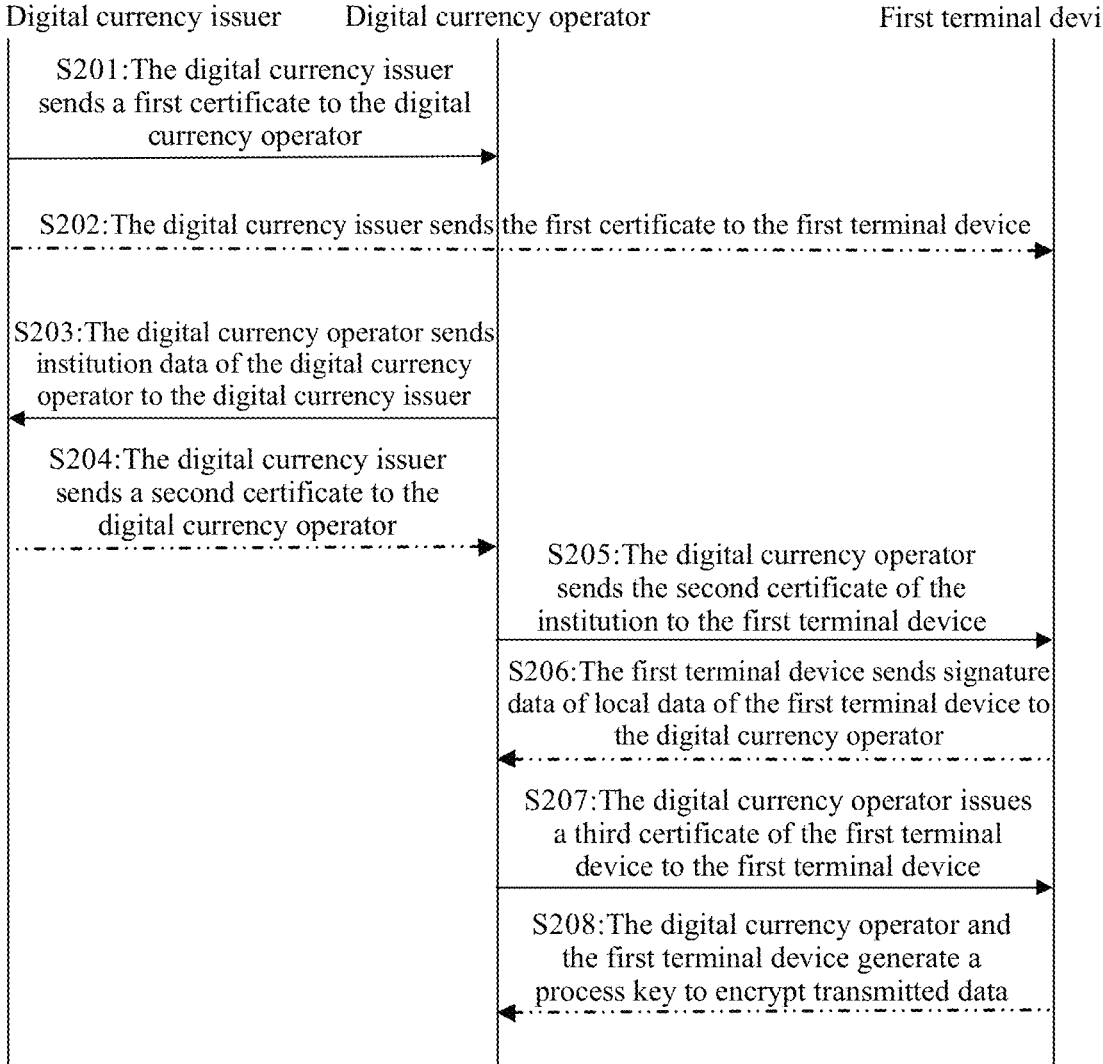

Digital currency issuer     Digital currency operator          First terminal device S201:The digital currency issuer sends a first certificate to the digital currency operator S202:The digital currency issuer sends the first certificate to the first terminal device S203:The digital currency operator sends institution data of the digital currency operator to the digital currency issuer S204:The digital currency issuer sends a second certificate to the digital currency operator S205:The digital currency operator sends the second certificate of the institution to the first terminal device S206:The first terminal device sends signature data of local data of the first terminal device to the digital currency operator S207:The digital currency operator issues a third certificate of the first terminal device to the first terminal device S208:The digital currency operator and the first terminal device generate a process key to encrypt transmitted data

FIG. 2

Dual-off-line receipt and payment

400

700

703

702

701

704

705

800

CPU — 801

ROM — 802

RAM — 803

804

I/O interface — 805

Input portion — 806

Output portion — 807

Storage portion — 808

Communication portion — 809

Driver — 810

Removable medium — 811

SECURITY AUTHENTICATION METHOD, APPARATUS AND SYSTEM FOR DIGITAL CURRENCY TRANSACTION

CROSS REFERENCE OF RELATED APPLICATION

This application is a national stage filing under 35 U.S.C. § 371 of International Patent Application Serial No. PCT/CN2023/078254, filed Feb. 24, 2023, which claims priority to Chinese Patent Application No. 202210173203.5 titled "SECURITY AUTHENTICATION METHOD, APPARATUS AND SYSTEM FOR DIGITAL CURRENCY TRANSACTION", filed on Feb. 24, 2022. The contents of these applications are which is-incorporated herein by reference in their entirety.

FIELD

The present disclosure relates to the field of computer technology, and in particular, to a method, an apparatus, and a system for security authentication of a digital currency transaction.

BACKGROUND

Digital currency is an important part of the new generation of payment method. With the increasing widespread adoption of digital currency, security protection of the digital currency attracts enough attention. In the existing digital currency transactions, there is no sufficient protection for information transmission security, device security control, user privacy, etc., no matter whether it is remote transmission or local transmission in a near-field range on a payment device and a recipient device, which poses certain security risks. In addition, data is likely to be hijacked or forged by middleman during a transmission process. Therefore, the digital currency is likely to be stolen, and is also subject to many external security threats. There is no good solution to theft of sensitive data and important data. Therefore, it is very important to achieve access control and encryption for sensitive and important data of digital currency to ensure the security of digital currency transactions.

In a process for this purpose, it is founded that there is at least the following problem in the conventional technology: there are technical problems of information theft, information leakage, and poor security in the authentication process.

SUMMARY

In view of the above, a method, an apparatus, and a system for security authentication of a digital currency transaction are provided in embodiments of the present disclosure.

To achieve the above objective, according to an aspect of an embodiment of the present disclosure, a method for security authentication of a digital currency transaction is provided.

A method for security authentication of a digital currency transaction includes: storing, by a first terminal device, a first certificate issued by a digital currency issuer and a second certificate issued by at least one digital currency operator, wherein the digital currency operator and the second certificate are in one-to-one correspondence, and the first certificate is to perform signature verification of the second certificate by the first terminal device; receiving, by the first terminal device, a third certificate sent by a first digital currency operator among the at least one digital currency operator, and performing, by the first terminal device, signature verification of the third certificate by using the second certificate, of which the signature verification passes, issued by the first digital currency operator, wherein the third certificate is generated by the first digital currency operator based on signature data of the first terminal device; and conducting, by the first terminal device, the digital currency transaction with the first digital currency operator and/or a second terminal device after the signature verification of the third certificate passes, wherein a fourth certificate sent by a second digital currency operator among the at least one digital currency operator is stored in the second terminal device.

In some embodiments of the present disclosure, the second certificate issued by the digital currency operator is generated by the digital currency issuer based on institution data of the digital currency operator, and is sent by the digital currency issuer to the digital currency operator, wherein the institution data includes an institution identification.

In some embodiments of the present disclosure, before receiving, by the first terminal device, the third certificate sent by the first digital currency operator among the at least one digital currency operator, the method includes: signing, by the first terminal device, local data of the first terminal device to generate signature data of the first terminal device, wherein the local data of the first terminal device includes a device identification of the first terminal device and a random number generated by the first terminal device; and sending, by the first terminal device, the signature data of the first terminal device to the first digital currency operator to generate the third certificate by the first digital currency operator based on the signature data of the first terminal device.

In some embodiments of the present disclosure, the step of conducting, by the first terminal device, the digital currency transaction with the first digital currency operator includes: encrypting, by the first terminal device, first business data of the digital currency transaction by using a first process key, and sending, by the first terminal device, the encrypted first business data to the first digital currency operator, to generate second business data of the digital currency transaction by the first digital currency operator based on the first business data; receiving, by the first terminal device, encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator; decrypting, by the first terminal device, the encrypted communication data to obtain the second business data, generating second digest information for the decrypted second business data, and performing signature verification of the digest information to obtain the first digest information; and comparing, by the first terminal device, the first digest information with the second digest information, performing a business processing on the second business data when the first digest information is consistent with the second digest information, and returning a processing result to the first digital currency operator.

In some embodiments of the present disclosure, the first process key is generated by each of the first terminal device and the first digital currency operator by: determining a first shared confidential key through a key negotiation between the first terminal device and the first digital currency operator; and encrypting, by using the first shared confidential key, the device identification of the first terminal device and the random number generated by the first terminal device, to obtain the first process key.

In some embodiments of the present disclosure, the step of conducting, by the first terminal device, the digital currency transaction with the second terminal device includes: sending, by the first terminal device, the third certificate to the second terminal device, and receiving the fourth certificate sent by the second terminal device; determining, by the first terminal device, the second digital currency operator from the at least one digital currency operator based on signature information in the fourth certificate; and performing, by the first terminal device, signature verification of the fourth certificate by using the second certificate, of which the signature verification passes, issued by the second digital currency operator.

In some embodiments of the present disclosure, the step of conducting, by the first terminal device, the digital currency transaction with the second terminal device further includes: encrypting, by the first terminal device, business data communicated in the digital currency transaction with the second terminal device by using a second process key, and sending, by the first terminal device, the encrypted business data to a counterpart terminal device, wherein the first terminal device and the second terminal device are counterpart terminal devices to each other, and wherein the second process key is generated by each of the first terminal device and the second terminal device by: determining a second shared confidential key through a key negotiation between the first terminal device and the second terminal device, and exchanging random numbers with each other; processing the random numbers of the first terminal device and the second terminal device according to a preset processing rule, to obtain a to-be-encrypted random number; and encrypting the to-be-encrypted random number by using the second shared confidential key, to obtain the second process key.

In some embodiments of the present disclosure, the first terminal device performs a local operation related to the digital currency transaction in a secure encryption chip, and the local operation includes one or more of a process key generating operation, a data encryption operation, a data decryption operation, a signing operation, and a signature verification operation, wherein the process key is a first process key for conducting the digital currency transaction with the first digital currency operator, or a second process key for conducting the digital currency transaction with the second terminal device.

According to another aspect of the embodiments of the present disclosure, an apparatus for security authentication of a digital currency transaction is provided.

An apparatus for security authentication of a digital currency transaction, which is applied in a first terminal device, includes: a certificate storage module configured to store a first certificate issued by a digital currency issuer and a second certificate issued by at least one digital currency operator, wherein the digital currency operator and the second certificate are in one-to-one correspondence; a signature verification module configured to perform signature verification of the second certificate by using the first certificate; a certificate receiving module configured to receive a third certificate sent by a first digital currency operator among the at least one digital currency operator; the signature verification module is further configured to perform signature verification of the third certificate by using the second certificate, of which the signature verification passes, issued by the first digital currency operator, wherein the third certificate is generated by the first digital currency operator based on signature data of the first terminal device; and a secure transaction module configured to conduct the digital currency transaction with the first digital currency operator and/or a second terminal device after the signature verification of the third certificate passes, wherein a fourth certificate sent by a second digital currency operator among the at least one digital currency operator is stored in the second terminal device.

In some embodiments of the present disclosure, the second certificate issued by the digital currency operator is generated by the digital currency issuer based on institution data of the digital currency operator and is sent by the digital currency issuer to the digital currency operator, where the institution data includes an institution identification.

In some embodiments of the present disclosure, the apparatus further includes a signing module configured to: sign local data of the first terminal device to generate signature data of the first terminal device, wherein the local data of the first terminal device includes a device identification of the first terminal device and a random number generated by the first terminal device; and send the signature data of the first terminal device to the first digital currency operator to generate the third certificate by the first digital currency operator based on the signature data of the first terminal device.

In some embodiments of the present disclosure, the secure transaction module is further configured to: encrypt first business data of the digital currency transaction by using a first process key, and send the encrypted first business data to the first digital currency operator, to generate second business data of the digital currency transaction by the first digital currency operator based on the first business data; receive encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator; decrypt the encrypted communication data to obtain the second business data, generate second digest information for the decrypted second business data, and perform signature verification of the digest information to obtain the first digest information; and compare the first digest information with the second digest information, perform a business processing on the second business data when the first digest information is consistent with the second digest information, and return a processing result to the first digital currency operator.

In some embodiments of the present disclosure, the secure transaction module is further configured to: determine a first shared confidential key through a key negotiation between the first terminal device and the first digital currency operator; and encrypt, by using the first shared confidential key, the device identification of the first terminal device and the random number generated by the first terminal device, to obtain the first process key.

In some embodiments of the present disclosure, the secure transaction module is further configured to send the third certificate to the second terminal device, and receive the fourth certificate sent by the second terminal device; and the signature verification module is further configured to determine the second digital currency operator from the at least one digital currency operator based on signature information in the fourth certificate; and perform signature verification of the fourth certificate by the first terminal device using the second certificate, of which the signature verification passes, issued by the second digital currency operator.

In some embodiments of the present disclosure, the secure transaction module is further configured to encrypt, by the first terminal device, business data communicated in the digital currency transaction with the second terminal device by using a second process key, and send, by the first terminal device, the encrypted business data to a counterpart terminal device, wherein the first terminal device and the second terminal device are counterpart terminal devices to each other, and wherein the second process key is generated by each of the first terminal device and the second terminal device by: determining a second shared confidential key through a key negotiation between the first terminal device and the second terminal device, and exchanging random numbers with each other; processing the random numbers of the first terminal device and the second terminal device according to a preset processing rule, to obtain a to-be-encrypted random number; and encrypting the to-be-encrypted random number by using the second shared confidential key, to obtain the second process key.

In some embodiments of the present disclosure, the first terminal device performs a local operation related to the digital currency transaction in a secure encryption chip, the local operation includes one or more operations of: a process key generating operation, a data encryption operation, a data decryption operation, a signing operation, and a signature verification operation, wherein the process key is a first process key for conducting the digital currency transaction with the first digital currency operator, or a second process key for conducting the digital currency transaction with the second terminal device.

According to another aspect of the embodiments of the present disclosure, a system for security authentication of a digital currency transaction is provided.

A system for security authentication of a digital currency transaction includes: a digital currency issuer, at least one digital currency operator, and a first terminal device, wherein the first terminal device includes the apparatus for security authentication of a digital currency transaction according to any of the embodiments of the present disclosure.

According to another aspect of the embodiments of the present disclosure, an electronic device is provided.

An electronic device includes: one or more processors, and a memory configured to store one or more programs. The one or more programs, when executed by the one or more processors, cause the one or more processors to implement the method for security authentication of the digital currency transaction provided by any of the embodiments of the present disclosure.

According to yet another aspect of the embodiments of the present disclosure, a computer-readable medium is provided.

A computer-readable medium has a computer program stored thereon. The program, when executed by a processor, implement the method for security authentication of the digital currency transaction provided by any of the embodiments of the present disclosure.

The embodiment in the above disclosure achieves the following advantages or beneficial effects. The first terminal device stores a first certificate issued by a digital currency issuer and a second certificate issued by at least one digital currency operator, wherein the first certificate is to perform signature verification of the second certificate by the first terminal device; the first terminal device receives a third certificate sent by a first digital currency operator among the at least one digital currency operator, and performs signature verification of the third certificate by using the second certificate, of which the signature verification passes, issued by the first digital currency operator, wherein the third certificate is generated by the first digital currency operator based on signature data of the first terminal device; and the first terminal device conducts the digital currency transaction with the first digital currency operator and/or a second terminal device, after the signature verification of the third certificate passes, wherein a fourth certificate sent by a second digital currency operator among the at least one digital currency operator is stored in the second terminal device.

Further effects of the above-mentioned non-conventional alternations are described below in conjunction with specific implementations.

BRIEF DESCRIPTION OF THE DRAWINGS

The accompanying drawings are provided for a better understanding of the present disclosure and do not constitute an improper limitation of the present disclosure. In the drawings:

FIG. 1 is a schematic diagram of main steps of a method for security authentication of a digital currency transaction according to an embodiment of the present disclosure;

FIG. 2 is a schematic diagram of a process of security authentication of a digital currency transaction according to an embodiment of the present disclosure;

DETAILED DESCRIPTION OF THE EMBODIMENTS

Figure 3:
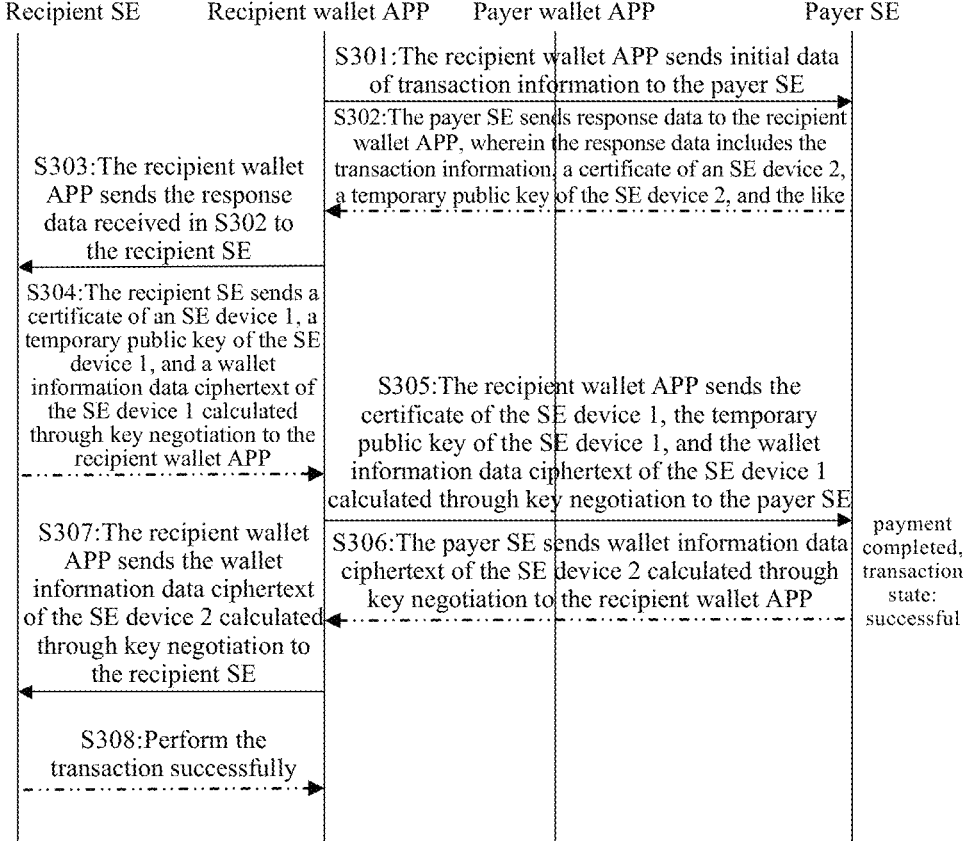
FIG. 3 is a schematic diagram of a process of security authentication of a digital currency transaction according to another embodiment of the present disclosure.

Exemplary embodiments of the present disclosure are described below in connection with the accompanying drawings. In the following description, various details of the embodiments of the present disclosure are included to aid in understanding, and they should be considered as being merely exemplary. Therefore, those of ordinary skill in the art should understand that various changes and modifications can be made to the embodiments described herein without departing from the scope and spirit of the present disclosure. Descriptions of well-known functions and constructions are omitted from the following description, for clarity and conciseness.

FIG. 1 is a schematic diagram of main steps of a method for security authentication of a digital currency transaction according to an embodiment of the present disclosure.

As shown in FIG. 1, the method for security authentication of the digital currency transaction according to an embodiment of the present disclosure mainly includes step S101 to step S103 as follows.

In step S101, a first terminal device stores a first certificate issued by a digital currency issuer and a second certificate issued by at least one digital currency operator. The digital currency operator and the second certificate are in one-to-one correspondence, and the first certificate is to perform signature verification of the second certificate by the first terminal device.

In step S102, the first terminal device receives a third certificate sent by a first digital currency operator among the at least one digital currency operator, and performs signature verification of the third certificate by using the second certificate, of which the signature verification passed, issued by the first digital currency operator, wherein the third certificate is generated by the first digital currency operator based on signature data of the first terminal device.

In step S103, the first terminal device conducts the digital currency transaction with the first digital currency operator and/or a second terminal device, after the signature verification of the third certificate passes, wherein in the second terminal device, a fourth certificate sent by a second digital currency operator among the at least one digital currency operator is stored.

The first terminal device and the second terminal device are different terminal devices.

The digital currency issuer may be a Certificate Issuer (CI) certificate issuance center of a central bank. The digital currency operator may be an authentication system of a banking institution, including but not limited to an authentication system of a commercial banking institution, a UnionPay institution, and the like. In the embodiments of the present disclosure, a certificate issued by the digital currency issuer is referred to as the first certificate, and a certificate issued by the digital currency operator is referred to as the second certificate. Each digital currency operator issues its own second certificate. The digital currency operator and the second certificate are in one-to-one correspondence.

The second certificate issued by the digital currency operator is generated by the digital currency issuer based on institution data of the digital currency operator and is sent by the digital currency issuer to the digital currency operator. The institution data includes an institution identification. In an implementation, the digital currency operator may send the institution data including the institution identification, certificate content, and the like, to the digital currency issuer. The digital currency issuer signs the received institution data with a private key of the digital currency issuer, to obtain the second certificate, and returns the second certificate to the digital currency operator, to be issued by the digital currency operator to the first terminal device.

The first certificate includes a public key of the digital currency issuer and may be used for the signature verification of the second certificate to determine that the second certificate is issued by the digital currency issuer.

Before the first terminal device receives the third certificate sent by the first digital currency operator among the at least one digital currency operator, the first terminal device may sign local data of the first terminal device to generate signature data of the first terminal device. The local data of the first terminal device includes a device identification of the first terminal device and a random number generated by the first terminal device. The first terminal device sends the signature data of the first terminal device to the first digital currency operator, to generate the third certificate by the first digital currency operator based on the signature data of the first terminal device. Specifically, the first digital currency operator may sign the signature data of the first terminal device with the private key of the first digital currency operator, to generate the third certificate. The second certificate issued by the first digital currency operator includes a public key of the first digital currency operator. Thereby, the first terminal device is able to perform signature verification of the third certificate sent by the first digital currency operator through the second certificate issued by the first digital currency operator.

The third certificate and the fourth certificate are both wallet certificates, but belong to different terminal devices. The second terminal device signs local data of the second terminal device (including a device identification of the second terminal device and a random number generated by the second terminal device) to generate signature data of the second terminal device, and sends the signature data of the second terminal device to the second digital currency operator. The second digital currency operator generates the fourth certificate based on the signature data of the second terminal device.

The step of conducting, by the first terminal device, the digital currency transaction with the first digital currency operator may include: encrypting, by the first terminal device, first business data of the digital currency transaction by using a first process key, and sending, by the first terminal device, the encrypted first business data to the first digital currency operator, to generate second business data of the digital currency transaction by the first digital currency operator based on the first business data; receiving, by the first terminal device, encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator; decrypting, by the first terminal device, the encrypted communication data to obtain the second business data, generating second digest information for the decrypted second business data, and performing signature verification of the digest information to obtain the first digest information; and comparing, by the first terminal device, the first digest information with the second digest information, performing a business processing on the second business data when the first digest information is consistent with the second digest information, and returning a processing result to the first digital currency operator.

The first business data refers to business data that the first terminal device needs to communicate with the first digital currency operator when conducting the digital currency transaction. The second business data refers to business data that the first digital currency operator needs to communicate with the first terminal device when conducting the digital currency transaction. Specific content of the business data is related to a transaction type.

The first process key is generated by each of the first terminal device and the first digital currency operator by:

determining a first shared confidential key through a key negotiation between the first terminal device and the first digital currency operator; and encrypting, by using the first shared confidential key, the device identification of the first terminal device and the random number generated by the first terminal device, to obtain the first process key.

The step of conducting, by the first terminal device, the digital currency transaction with the second terminal device may include the following steps. The first terminal device may send the third certificate to the second terminal device, and receive the fourth certificate sent by the second terminal device. The first terminal device determines the second digital currency operator from the at least one digital currency operator based on signature information in the fourth certificate. Specifically, the signature information in the fourth certificate includes a private key signature of the second digital currency operator, that is, data obtained by signing signature data of the second terminal device, and the second digital currency operator may be determined based on the private key signature. The first terminal device performs signature verification of the fourth certificate by using the second certificate, of which the signature verification passes, issued by the second digital currency operator. Specifically, the signature verification of the fourth certificate may be performed by using the public key of the second digital currency operator in the second certificate issued by the second digital currency operator.

The step of conducting, by the first terminal device, the digital currency transaction with a second terminal device may further include: encrypting, by the first terminal device, business data communicated in the digital currency transaction with the second terminal device by using a second process key, and sending, by the first terminal device, the encrypted business data to a counterpart terminal device, wherein the first terminal device and the second terminal device are counterpart terminal devices to each other. That is, the counterpart terminal device of the first terminal device is the second terminal device, and the counterpart terminal device of the second terminal device is the first terminal device. The second process key is generated by the first terminal device and the second terminal device by: determining a second shared confidential key through a key negotiation between the first terminal device and the second terminal device, and exchanging random numbers with each other; processing the random numbers of the first terminal device and the second terminal device according to a preset processing rule, to obtain a to-be-encrypted random number; and encrypting the to-be-encrypted random number by using the second shared confidential key, to obtain the second process key.

Processing according to the preset processing rule to obtain the to-be-encrypted random number may be embodied by concatenating the random numbers of the first terminal device and the second terminal device to obtain the to-be-encrypted random number.

The first terminal device performs a local operation related to the digital currency transaction in a secure encryption chip (SE). The local operation includes one or more of a process key generating operation, a data encryption operation, a data decryption operation, a signing operation, and a signature verification operation. The process key is a first process key for conducting the digital currency transaction with the first digital currency operator, or a second process key for conducting the digital currency transaction with the second terminal device. The data encryption operation may include, but is not limited to, an operation of encrypting communicated business data by using a process key. The data decryption operation may be a decryption operation corresponding to the data encryption operation.

FIG. 2 is a schematic diagram of a process of security authentication of a digital currency transaction according to an embodiment of the present disclosure.

As shown in FIG. 2, a process of security authentication of a digital currency transaction according to an embodiment of the present disclosure includes: sending, by a digital currency issuer, a first certificate to a digital currency operator (S201); sending, by the digital currency issuer, a first certificate to a first terminal device (S202); sending, by the digital currency operator, institution data of the digital currency operator to the digital currency issuer (S203); sending, by the digital currency issuer, a second certificate to the digital currency operator (S204); sending, by the digital currency operator, a second certificate of the institution to the first terminal device (S205); sending, by the first terminal device, signature data of local data of the first terminal device to the digital currency operator (S206); issuing, by the digital currency operator, a third certificate of the first terminal device to the first terminal device (S207); and generating, by the digital currency operator and the first terminal device, a process key to encrypt transmitted data (S208).

The process key in this embodiment is the first process key, which is not explained in further detail hereinafter.

The process of security authentication of a digital currency transaction according to the embodiment is illustrated below. Hereinafter, a digital currency operator is referred to as an authentication system of a banking institution; a digital currency issuer is referred to a CI certificate issuance center of a central bank; and an SE terminal device refers to a terminal device equipped with a security encryption chip (SE), which is the first terminal device in this embodiment.

The digital currency operator receives a first certificate issued by the CI certificate issuance center of the central bank. The digital currency operator sends its bank institution data (including an institution identification, certificate content, and the like) to the CI certificate issuance center of the central bank. The CI certificate issuance center of the central bank signs the bank institution data by using a central bank private key (or referred to as a first private key) to obtain a second certificate. The digital currency operator performs signature verification of the second certificate by using a central bank public key in the first certificate. After the signature verification passes, the digital currency operator sends the second certificate to the SE terminal device. The SE terminal device receives the first certificate issued by the CI certificate issuance center of the central bank and the second certificate, of which the signature verification passed, sent by the digital currency operator. The SE terminal device performs signature verification of the second certificate by using the first certificate, and sends signature data, which is obtained by signing local data such as a device identification CID, a random number and the like using a local private key (or referred to as a third private key) of the SE terminal device, to the digital currency operator through a security gateway. The digital currency operator signs the signature data of the SE terminal device by using a private key (or referred to as a second private key) owned by the digital currency operator, to obtain a third certificate, and sends the third certificate to the SE terminal device. The SE terminal device performs signature verification of the third certificate by using the second certificate (which is specifically performed by using a banking institution public key in the second certificate (that is, a public key of the digital currency operator). After the signature verification of the third certificate by the SE terminal device passes, each of the digital currency operator and the SE terminal device generates a data communication key (or referred to as a shared confidential key).

The SE terminal device includes a random number generator which generates random numbers during the process of security authentication. In a complete authentication process, the random numbers have the same value. Each of the digital currency operator and the SE terminal device generates the data communication key. The data communication key is used to create a same shared confidential key (i.e., the first shared confidential key) between the digital currency operator and the SE terminal device by using an SM2 elliptic curve key agreement protocol algorithm. The device identification CID and random number are encrypted by using the data communication keys, to generate process keys. The process keys may be used to perform encryption and decryption of the communication data through a symmetric encryption algorithm, an Advanced Encryption Standard (AES) algorithm, or an SM4 (SM4 cryptographic algorithm) algorithm by State Cryptography Administration, to complete an encrypted communication between the digital currency operator and the SE terminal device. The process keys generated by each of the digital currency operator and the SE terminal device respectively have the same value.

The communication data refers to specific business data transmitted between the digital currency operator and the SE terminal device when conducting a digital currency transaction. The communication data may include currency string transaction information, transaction index, and the like, and the specific content varies depending on a business type of the transaction.

The data sent from the digital currency operator to the SE terminal device further includes a digest information signature. The digest information signature is obtained by signing first digest information by the digital currency operator using the second private key (i.e., the private key owned by the digital currency operator). The first digest information is obtained by calculating the communication data by the digital currency operator by means of a digest algorithm using the data communication key. The digest algorithm is a Secure Hash Algorithm (SHA) 256 algorithm, or an SM3 (SM3 Cryptographic Hash Algorithm) algorithm by State Cryptography Administration. The communication data calculated through the digest algorithm in the digital currency operator is the same as the communication data encrypted by using the process key.

After the SE terminal device receives the digest information signature and the data obtained by the digital currency operator encrypting the communication data by using the process key, the SE terminal device performs signature verification of the digest information signature (which may be performed by using the public key of the digital currency operator), and decrypts the encrypted communication data to obtain the communication data. The SE terminal device calculates, by using the same digest algorithm, digest information of the decrypted communication data (i.e., second digest information); compares the digest information obtained from the calculation with the digest information obtained from the signature verification (i.e., the first digest information), and when the second digest information is the same as the first digest information, it is determined that the communication data is not tampered with by a third party during a transmission process, and thereby security of the received communication data is confirmed.

When the first digest information is consistent with the second digest information, the SE terminal device processes operation information in the communication data. In an example of a recharge service, the SE terminal device performs a terminal operation related to the recharge, and then encrypts processed data (i.e., a business processing result of the second business data) by using the process key, and returns the encrypted data to the digital currency operator through the security gateway. When the digest information obtained from calculation (i.e., the second digest information) is different from the digest information obtained from the signature verification (i.e., the first digest information), it is determined that the communication data may have been tampered with by a third party, and the SE terminal device refuses to execute the received communication data and deletes the received communication data.

In the method for security authentication according to an embodiment of the present disclosure, the private key of the SE terminal device is stored in an embedded programmable logic controller (that is, a security encryption chip (SE)) of the SE terminal device, and is prohibited from being read. The private key is used to perform key negotiation with the digital currency operator to generate the process key, and all the computing processes such as encryption, decryption, data signature, signature verification, and so on, of the communication data are completed within the security encryption chip, ensuring security of the key information, which is returned to the digital currency operator through the security gateway. In this way, security of the communication data can be ensured for various businesses of digital currency transactions, such as opening, recharge, withdrawal, cancellation, and the like.

FIG. 3 is a schematic diagram of a process of security authentication of a digital currency transaction according to another embodiment of the present disclosure.

As shown in FIG. 3, a process of security authentication of a digital currency transaction according to another embodiment of the present disclosure includes: sending, by a recipient wallet APP, initial data of transaction information to a payer SE (S301); sending, by the payer SE, response data to the recipient wallet APP (S302), wherein the response data includes the transaction information, a certificate of an SE device 2, a temporary public key of the SE device 2 and the like; sending, by the recipient wallet APP, the response data received in S302 to a recipient SE (S303); sending, by the recipient SE, a certificate of an SE device 1, a temporary public key of the SE device 1, and a wallet information data ciphertext of the SE device 1 calculated through key negotiation to the recipient wallet APP (S304); sending, by the recipient wallet APP, the certificate of the SE device 1, the temporary public key of the SE device 1, and the wallet information data ciphertext of the SE device 1 calculated through key negotiation to the payer SE (S305); sending, by the payer SE, wallet information data ciphertext of the SE device 2 calculated through key negotiation to the recipient wallet APP (S306); sending, by the recipient wallet APP, the wallet information data ciphertext of the SE device 2 calculated through key negotiation to the recipient SE (S307); completing the transaction successfully (S308), and sending a notification message.

In the embodiment, the SE device 1 is referred to as a first terminal device, and the SE device 2 is referred to as a second terminal device. The first terminal device serves as a recipient device in this embodiment, and the second terminal device serves as a payer device in this embodiment. The recipient wallet APP is a wallet application on the first terminal device, and the payer wallet APP is a wallet application on the second terminal device. The recipient SE is a security encryption chip of the first terminal device, and the payer SE is a security encryption chip of the second terminal device. Those skilled in the art can understand that in other embodiments, the first terminal device may serve as the recipient device and the second terminal device may serve as the payer device.

The process of security authentication of a digital currency transaction according to the embodiment is illustrated below. Hereinafter, a digital currency operator is referred to as an authentication system of a banking institution, and a digital currency issuer is referred to as a CI certificate issuance center of a central bank.

The SE device 1 and the SE device 2 both receive a first certificate issued by the CI certificate issuance center of the central bank and a second certificate issued by the digital currency operator. The digital currency operator that issues the second certificate to the SE device 1 may be the same as or different from the digital currency operator that issues the second certificate to the SE device 2.

The SE device 1 sends a signed certificate owned by the SE device 1 (i.e., a third certificate) to the SE device 2 through the near field communication (NFC), and the SE device 2 sends a signed certificate owned by the SE device 2 (i.e., a fourth certificate) to the SE device 1. The third certificate and the fourth certificate are wallet certificates of corresponding terminal devices, respectively, and are used for verifying each other when the two terminal devices conduct an offline transaction. The third certificate and the fourth certificate are subject to verification protection from the first certificate and the second certificate issued by the corresponding digital currency operator. That is, the first certificate is used for signature verification of the second certificate. After the signature verification passes, the second certificate may be used for signature verification of the third certificate. The SE device 2 receives the third certificate of the SE device 1 and performs the signature verification. After the signature verification passes, an offline wallet transaction is performed subsequently (that is, a currency string ciphertext is sent to the other party, and the other party receives the currency string information).

During a secure transaction process, the SE device 1 sends a generated random number, a temporary public key, currency string transaction information, and the like. Each of the SE device 1 and the SE device 2 generates a data communication key through the SM2 elliptic curve key agreement protocol algorithm, so as to create a shared confidential key (i.e., a second shared confidential key) between the SE device 1 and the SE device 2. The shared confidential key is a data communication key achieving consistency in the negotiation. The random numbers generated by each of the terminal devices of both parties (the SE device 1 and the SE device 2) are processed by using the data communication key. For example, the random numbers generated by each of the SE device 1 and the SE device 2 are concatenated to obtain a new to-be-encrypted random number. The to-be-encrypted random number is encrypted by using the shared confidential key (i.e., the second shared confidential key), to generate a process key (which in this embodiment is a second process key, and is not explained hereinafter). The process key may be used to encrypt and decrypt the communication data through the symmetric encryption algorithm, the SM4 (SM4 cryptographic algorithm) by State Cryptography Administration, or the Advanced Encryption Standard (AES) algorithm. Thereby, transaction data communication, such as a cryptocurrency string transmission, and so on, between the SE device 1 and the SE Device 2 is completed.

In the method for security authentication according to an embodiment of the present disclosure, the private key is stored in an embedded programmable logic controller (that is, a security encryption chip) of the SE terminal device, and is prohibited from being read. The private key is utilized to perform key negotiation with the reciprocal device to generate the process key, and all the computing processes such as the encryption, decryption, data signature, signature verification, and so on, of the communication data are completed within the security encryption chip, ensuring security of the key information.

Figure 4:
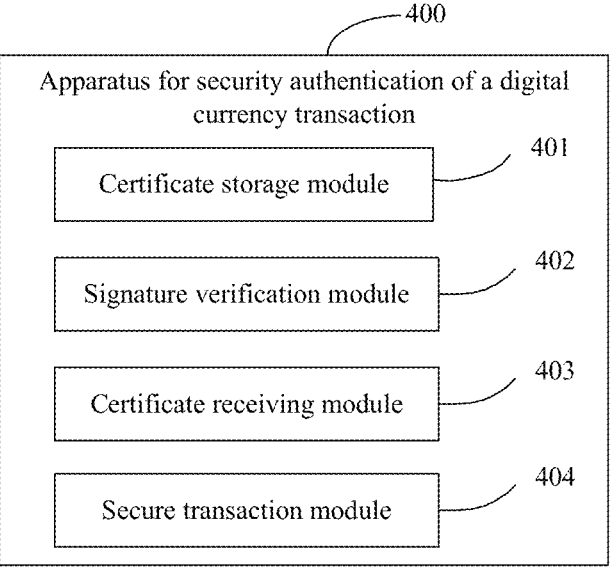
FIG. 4 is a schematic diagram of main modules of an apparatus for security authentication of a digital currency transaction according to an embodiment of the present disclosure.

FIG. 4 is a schematic diagram of main modules of an apparatus for security authentication of a digital currency transaction according to an embodiment of the present disclosure.

As shown in FIG. 4, the apparatus 400 for security authentication of a digital currency transaction according to the embodiment of the present disclosure is applicable to a terminal device. The following is introduced taking the first terminal device as an example. The apparatus 400 for security authentication of a digital currency transaction mainly includes a certificate storage module 401, a signature verification module 402, a certificate receiving module 403, and a secure transaction module 404.

The certificate storage module 401 is configured to store a first certificate issued by a digital currency issuer and a second certificate issued by at least one digital currency operator, where the digital currency operator and the second certificate are in one-to-one correspondence.

The signature verification module 402 is configured to perform signature verification of the second certificate by using the first certificate.

The certificate receiving module 403 is configured to receive a third certificate sent by a first digital currency operator among the at least one digital currency operator.

The signature verification module 402 is further configured to perform signature verification of the third certificate by using the second certificate, of which the signature verification passes, issued by the first digital currency operator, wherein the third certificate is generated by the first digital currency operator based on signature data of the first terminal device.

The secure transaction module 404 is configured to conduct the digital currency transaction with the first digital currency operator and/or a second terminal device after the signature verification of the third certificate passes, wherein the second terminal device stores a fourth certificate sent by a second digital currency operator among the at least one digital currency operator.

The second certificate issued by the digital currency operator is generated by the digital currency issuer based on institution data of the digital currency operator and is sent by the digital currency issuer to the digital currency operator. The institution data includes an institution identification.

The apparatus 400 for security authentication of a digital currency transaction may further include a signing module. The signing module is configured to: sign local data of the first terminal device to generate signature data of the first terminal device, wherein the local data of the first terminal device includes a device identification of the first terminal device and a random number generated by the first terminal device; and send the signature data of the first terminal device to the first digital currency operator, to generate the third certificate by the first digital currency operator based on the signature data of the first terminal device.

In an embodiment of the present disclosure, the secure transaction module 404 is further configured to: encrypt first business data of the digital currency transaction by using a first process key, and send the encrypted first business data to the first digital currency operator to generate second business data of the digital currency transaction by the first digital currency operator based on the first business data; receive encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator; decrypt the encrypted communication data to obtain the second business data, generate second digest information for the decrypted second business data, and perform signature verification of the digest information to obtain the first digest information; and compare the first digest information with the second digest information, perform a business processing on the second business data when the first digest information is consistent with the second digest information, and return a processing result to the first digital currency operator.

The secure transaction module 404 is further configured to: determine a first shared confidential key through a key negotiation between the first terminal device and the first digital currency operator; and encrypt, by using the first shared confidential key, the device identification of the first terminal device and the random number generated by the first terminal device, to obtain the first process key.

In another embodiment, the secure transaction module 404 is further configured to: send the third certificate to the second terminal device, and receive the fourth certificate sent by the second terminal device.

The signature verification module 402 is further configured to: determine the second digital currency operator from the at least one digital currency operator based on signature information in the fourth certificate; and perform signature verification of the fourth certificate by the first terminal device using the second certificate, of which the signature verification passes, issued by the second digital currency operator.

The secure transaction module 404 is further configured to: encrypt, by the first terminal device, business data communicated in the digital currency transaction with the second terminal device by using a second process key, and send, by the first terminal device, the encrypted business data to a counterpart terminal device, wherein the first terminal device and the second terminal device are counterpart terminal devices to each other, and wherein the second process key is generated by the first terminal device and the second terminal device by: determining a second shared confidential key through a key negotiation between the first terminal device and the second terminal device, and exchanging random numbers with each other; processing the random numbers of the first terminal device and the second terminal device according to a preset processing rule, to obtain a to-be-encrypted random number; and encrypting the to-be-encrypted random number by using the second shared confidential key, to obtain the second process key.

In the embodiment of the present disclosure, the first terminal device may perform a local operation related to the digital currency transaction in a secure encryption chip. The local operation includes one or more of a process key generating operation, a data encryption operation, a data decryption operation, a signing operation, and a signature verification operation. The process key is a first process key for conducting the digital currency transaction with the first digital currency operator, or a second process key for conducting the digital currency transaction with the second terminal device.

In addition, specific implementations of the apparatus for security authentication of a digital currency transaction in the embodiment of the present disclosure are described in detail in the method for security authentication of a digital currency transaction, and therefore repeated content thereof is not described here.

Figure 5:
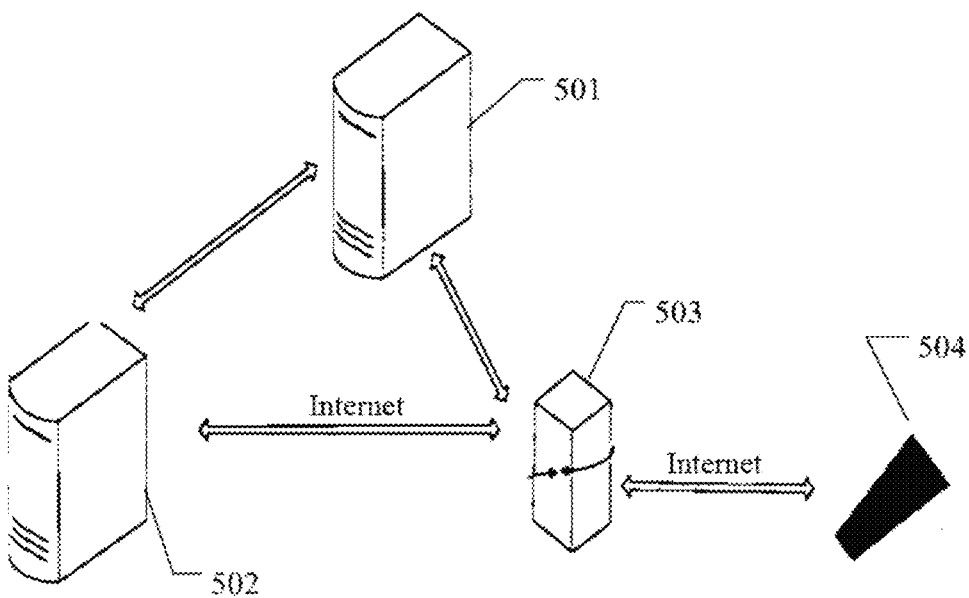
FIG. 5 is a schematic diagram of an architecture of a system for security authentication of a digital currency transaction according to an embodiment of the present disclosure.

FIG. 5 is a schematic diagram of an architecture of a system for security authentication of a digital currency transaction according to an embodiment of the present disclosure.

As shown in FIG. 5, the system for security authentication of a digital currency transaction according to an embodiment of the present disclosure includes a digital currency issuer 501, a digital currency operator 502, and a terminal device 504. The terminal device 504 interacts with the digital currency issuer 501 and the digital currency operator 502 through a security gateway 503.

The system for security authentication of a digital currency transaction according to the embodiment of the present disclosure is illustrated in detail below. The digital currency issuer 501 may be a CI (Certificate Issuer) certificate issuance center of a central bank. The digital currency operator 502 is specifically an authentication system of a banking institution (hereinafter referred to as the banking institution in the embodiment). The terminal device 504 is the following SE terminal device, which may be a first terminal device.

The CI certificate issuance center of the central bank issues a first certificate to the banking institution and the SE terminal device respectively. The banking institution issues a second certificate to the SE terminal device. The CI certificate issuance center of the central bank stores a first private key that matches the first certificate (i.e., a central bank private key). The banking institution stores a second private key that matches the second certificate (i.e., a private key owned by the banking institution). The CI certificate issuance center of the central bank issues the first certificate to the banking institution, and the banking institution issues the second certificate to the SE terminal device.

The first certificate and the second certificate may be issued by directly placing the certificate into the banking institution or into the SE terminal device, or may be issued to the banking institution and the SE terminal device respectively through the Internet. A unique device identification CID is stored in the SE terminal device. The device identification CID is stored in an embedded ESIM (programmable logic controller) of the SE terminal device, that is, a security encryption chip (SE). The SE terminal device may be one or more of a mobile phone, a watch, a bracelet, a visual card, a special-shaped card, or may be other electronic wearable devices with a communication function. The banking institution performs data transmission with the SE terminal device through a security gateway.

In the embodiment, random numbers are generated during the security authentication process, and the random numbers are used for encryption operations of data during the security authentication process. With the certificate authentication system using elliptic curve encryption algorithm based on the SM2 State Cryptography algorithm, the identification CID of the SE terminal device, the public key and other authentication information are obtained, and the transmitted data is encrypted and decrypted based on a process key generated through negotiation between the banking institution and the SE terminal device. In this way, mutual authentication and secure communication between the banking institution and the SE terminal device is realized, and information leakage, illegal access, and other security risks are avoided.

Figure 6:
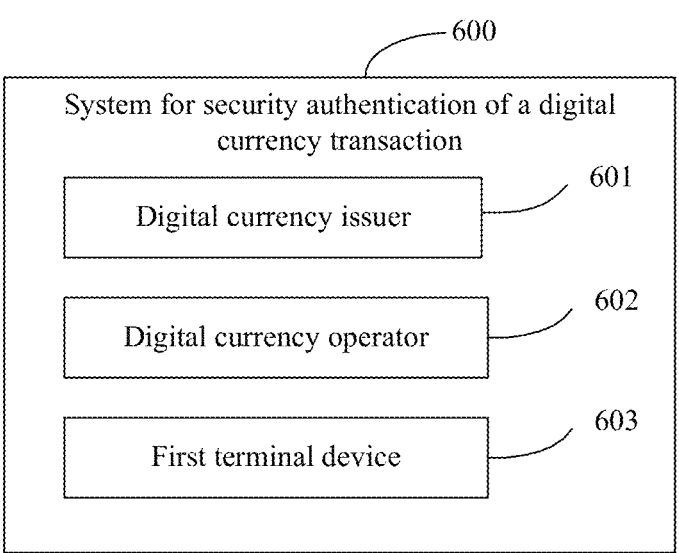
FIG. 6 is a schematic diagram of main components of a system for security authentication of a digital currency transaction according to an embodiment of the present disclosure.

FIG. 6 is a schematic diagram of main components of a system for security authentication of a digital currency transaction according to an embodiment of the present disclosure.

As shown in FIG. 6, the system 600 for security authentication of a digital currency transaction according to an embodiment of the present disclosure mainly includes a digital currency issuer 601, a digital currency operator 602, and a first terminal device 603.

The number of the digital currency operators 602 may be one or more. The first terminal device 603 includes the apparatus 400 for security authentication of a digital currency transaction according to any of the embodiments of the present disclosure.

The following description is made by taking an example in which the digital currency operator 602 is an authentication system of a banking institution (hereinafter referred to as a banking institution in this embodiment), the digital currency issuer 601 is a CI certificate issuance center of a central bank, and the first terminal device 603 is an SE terminal device.

The banking institution receives a first certificate issued by the CI certificate issuance center of the central bank (the first certificate is generated by signing data of the central bank with a root certificate of the central bank, and includes a public key of the central bank). The SE terminal device receives the first certificate issued by the CI certificate issuance center of the central bank and a second certificate issued by the banking institution. The banking institution sends its bank institution data to the CI certificate issuance center of the central bank through a security gateway. The CI certificate issuance center of the central bank signs the bank institution data by using a first private key owned by the CI certificate issuance center of the central bank, to obtain the second certificate. The banking institution performs signature verification of the second certificate by using the first certificate issued by the CI certificate issuance center of the central bank, and sends the second certificate to the SE terminal device. The SE terminal device performs signature verification of the second certificate by using the first certificate issued by the CI certificate issuance center of the central bank, and sends signature data, obtained by signing a device identification CID, a random number and the like with a third private key (i.e., a terminal key), to the banking institution through a security gateway. The banking institution performs signature verification of the signature data sent by the SE terminal device, and then signs the device identification CID and the random number and other signature data by using a second private key (i.e., a private key of the banking institution), to obtain a third certificate, and returns the third certificate to the SE terminal device. The SE terminal device performs signature verification of the third certificate by using the second certificate. After the signature verification of the third certificate passes, each of the banking institution and the SE terminal device generates a data communication key. Encryption may be performed with the public key, and decryption may be performed with the SE key. Alternatively, a key agreement protocol may be created by the second private key of the banking institution and the public key of the signature data of the SE terminal device sharing secret there between, and serves as a first data communication key between the banking institution and the SE terminal device; and a key agreement protocol may be created by the private key of the SE terminal device (i.e., the third private key) and the second certificate of the banking institution sharing secret there between, and serves as a second data communication key between the banking institution and the SE terminal device. The first data communication key is the same as the second data communication key, that is, serving as the data communication key. A process key is generated from the data communication key. A specific method of generating the process key is introduced in detail in the above embodiment, and is not repeated here. The banking institution encrypts the communication data by using the process key, and sends the encrypted communication data to the SE terminal device through the security gateway. The SE terminal device processes the decrypted communication data, encrypts the processed data by using the process key, and returns to the banking institution through the security gateway. The communication data is specifically business data of a digital currency transaction, such as business data related to opening, recharge, withdrawal, cancellation, and so on. An example of opening is described below. The SE terminal device is preset with a first certificate and a second certificate. During an opening process, the SE terminal device sends wallet opening initialization data WalletID, device type, wallet payment password ciphertext, timestamp, and the like, to the banking institution. The opening process begins after the verification by the banking institution passes. The SE terminal device uploads signature data of the SE terminal device. The banking institution may identify the SE terminal device according to a device identification in the signature data. The banking institution verifies the signature data of the SE terminal device. When it is determined that the verification passes, the banking institution issues, to the SE terminal device, a wallet certificate (that is, a third certificate), a transaction index, system parameter information and other opening data. After the signature verification of the third certificate passes, the SE terminal device may conduct subsequent business data communication with the banking institution.

For specific functions of the digital currency issuer 601, the digital currency operator 602, and the first terminal device 603, reference may be made to description of the above embodiments.

Figure 7:
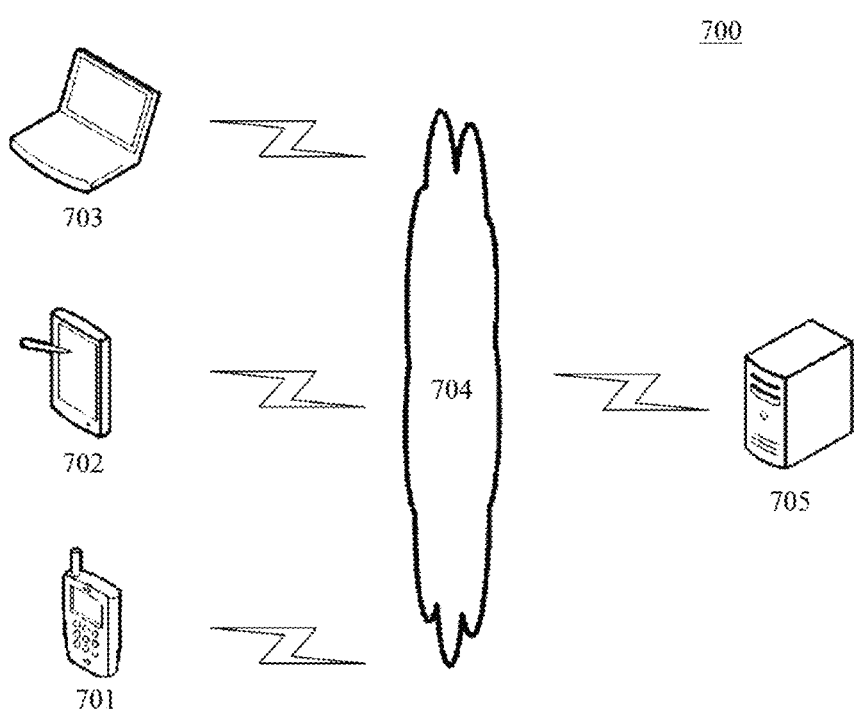
FIG. 7 is an exemplary system architecture diagram in which an embodiment of the present disclosure may be applied.

FIG. 7 shows an exemplary system architecture 700 in which a method for security authentication of a digital currency transaction or an apparatus for security authentication of a digital currency transaction according to embodiments of the present disclosure may be applied.

As shown in FIG. 7, the system architecture 700 may include terminal devices 701, 702, 703, a network 704 and a server 705. The network 704 is a medium configured to provide communication links among the terminal devices 701, 702, 703 and the server 705. The network 704 may include various connection types, such as wired communication links, wireless communication links, fiber optic cables, or the like.

The terminal devices 701, 702 and 703 may be used by the user to interact with the server 705 through the network 704, to receive or transmit a message, and the like. The terminal devices 701, 702, and 703 may have various communication client applications installed thereon, such as a shopping application, a web browser application, a search application, an instant messaging tool, an email client, social platform software, and the like (as examples only).

The terminal devices 701, 702, and 703 may be various electronic devices that have a display screen and support web browsing, including but not limited to smart phones, tablet computers, laptop computers, desktop computers, and the like.

The server 705 may provide various services, for example, serving as a back-end management server (as an example only) that provides support for a website related to a digital currency transaction browsed by the user through the terminal devices 701, 702, and 703. The back-end management server may analyze and process data such as the received transaction request and the like, and feedback the processing result (such as currency string transaction information, as an example only) to the terminal devices.

It should be noted that the method for security authentication of the digital currency transaction provided by the embodiment of the present disclosure is generally executed by the terminal devices 701, 702, and 703. Correspondingly, the apparatus for security authentication of the digital currency transaction is generally disposed in the terminal devices 701, 702, and 703.

It should be understood that the number of terminal devices, networks and servers shown in FIG. 7 are illustrative only. Depending on implementation needs, there may be any number of the terminal devices, networks, and servers.

Figure 8:
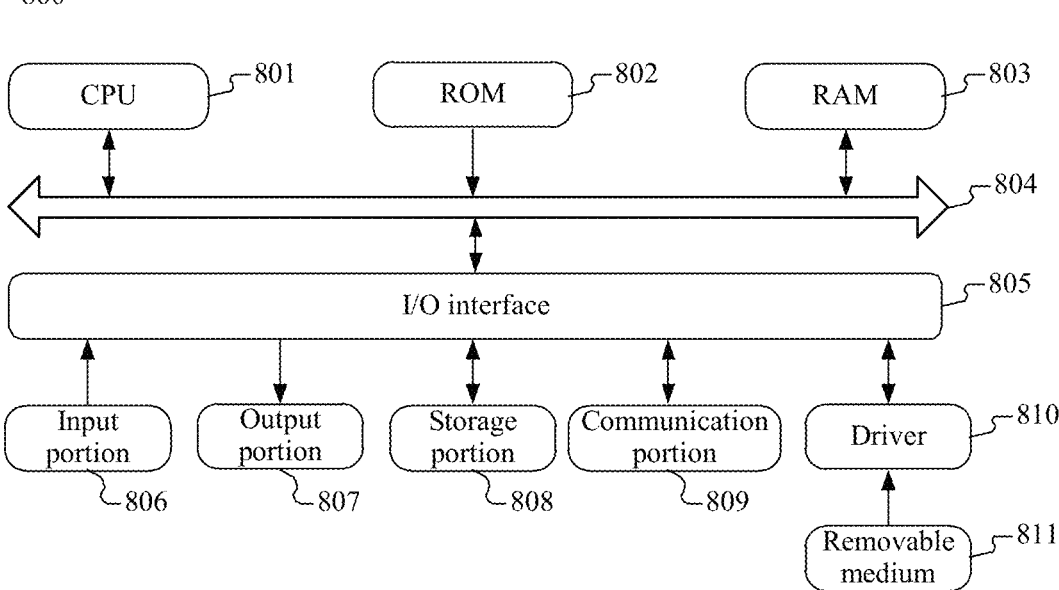
FIG. 8 is a schematic structural diagram of a computer system of a terminal device suitable for implementing an embodiment of the present disclosure.

Reference is made to FIG. 8, which shows a schematic structural diagram of a computer system 800 of a terminal device suitable for implementing an embodiment of the present disclosure. The terminal device shown in FIG. 8 is only an example, and should not be a limitation to a function or usage scope of the embodiments of the present disclosure.

As shown in FIG. 8, the computing system 800 includes a central processing unit (CPU) 801, which may execute various appropriate actions and processes according to a program stored in a read-only memory (ROM) 802 or a program loaded from a storage portion 808 to a random-access memory (RAM) 803. The RAM 803 also has various programs and data for operation of the system 800 stored thereon. The CPU 801, the ROM 802 and the RAM 803 are connected to each other via a bus 804. An input/output (I/O) interface 805 is also connected to the bus 804.

The following components are connected to the I/O interface 805: an input portion 806 (including a keyboard, a mouse, and the like), an output portion 807 (including a cathode ray tube (CRT), a liquid crystal display (LCD), a speaker, and the like), a storage portion 808 (including a hard disk, and the like), and a communication portion 809 (including a network interface card, such as a LAN card, a modem, and the like). The communication portion 809 performs communication processing via a network, such as the Internet. A driver 810 may be connected to the I/O interface 805 as needed. A removable medium 811, such as a magnetic disk, an optical disk, a magnetic optical disk, a semiconductor memory, etc., is installed on the driver 810 as required, so that a computer program read therefrom is installed on the storage portion 808 as required.

Particularly, according to an embodiment of the present disclosure, the foregoing process described with reference to the flow chart may be implemented as a computer software program. For example, according to an embodiment of the present disclosure, a computer program product including a computer program carried on a computer-readable medium is provided. The computer program includes program codes for performing the method shown in the flow chart. In such an embodiment, the computer program may be downloaded and installed from a network via the communication portion 809, and/or may be installed from the removable medium

811. When the computer program is executed by the central processing unit (CPU) 801, the functions defined in the system of the present disclosure are executed.

It should be noted that the computer-readable medium shown in the present disclosure may be a computer-readable signal medium or a computer-readable storage medium, or any combination thereof. The computer-readable storage medium may include, but is not limited to, a system, an apparatus, or a device in an electronic, magnetic, optical, electromagnetic, infrared, or semi-conductive form, or any combination thereof. More specific examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any suitable combination thereof. In the present disclosure, the computer-readable storage medium may be any tangible medium including or storing a program, and the program may be used by or in combination with an instruction execution system, apparatus, or device. In the present disclosure, a computer-readable signal medium may include a data signal propagated in baseband or as part of a carrier wave. The data signal carries computer-readable program codes. The propagated data signal may be in various forms, including but not limited to an electromagnetic signal, an optical signal or any proper combination thereof. Alternatively, the computer-readable signal medium may be any computer-readable medium other than the computer-readable storage medium. The computer-readable medium may send, propagate or transmit a program to be used by or in combination with an instruction execution system, apparatus or device. The program codes included in the computer-readable medium may be transmitted by using any suitable medium, including but not limited to, a wireless medium, a wire, an optical cable, radio frequency (RF) or the like, or any suitable combination thereof.

Flow charts and block diagrams in the drawings illustrate architecture, functions and operations that can be implemented by the system, method and computer program product according to the embodiments of the present disclosure. Each block in the flow charts or the block diagrams may represent a module, a program segment, or a portion of codes. The module, the program segment, or the portion of codes includes one or more executable instructions for implementing a specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on functions involved. It should be noted that each block in the block diagrams and/or the flow charts and a combination of blocks in the block diagrams and/or the flow charts may be implemented by using a dedicated hardware-based system for performing a specified function or operation, or may be implemented by using a combination of dedicated hardware and a computer instruction.

The modules mentioned in the description of the embodiments of the present disclosure may be implemented by means of software, or may be implemented by means of hardware. The described modules may be provided in a processor. For example, it may be described as follows: a processor includes a certificate storage module, a signature verification module, a certificate receiving module, and a secure transaction module. A name of a module does not constitute a limitation on the module itself under a certain circumstance. For example, the certificate storage module may be described as "a module configured to store a first certificate issued by a digital currency issuer and a second certificate issued by at least one digital currency operator".

In another aspect, a computer-readable medium is also provided in the present disclosure. The computer-readable medium may be included in the device described in the foregoing embodiments, or may be standalone, rather than being assembled in the electronic device. The computer-readable medium carries one or more programs. The one or more programs, when executed by the device, cause the device to implement operations as follows. A first terminal device stores a first certificate issued by a digital currency issuer and a second certificate issued by at least one digital currency operator, wherein the digital currency operator and the second certificate are in one-to-one correspondence, and the first certificate is to perform signature verification of the second certificate by the first terminal device. The first terminal device receives a third certificate sent by a first digital currency operator among the at least one digital currency operator, and performs signature verification of the third certificate by using the second certificate, of which the signature verification passes, issued by the first digital currency operator, where the third certificate is generated by the first digital currency operator based on signature data of the first terminal device. The first terminal device conducts the digital currency transaction with the first digital currency operator and/or a second terminal device after the signature verification of the third certificate passes, wherein a fourth certificate sent by a second digital currency operator among the at least one digital currency operator is stored in the second terminal device.

According to the technical solution in the embodiments of the present disclosure, the first terminal device stores a first certificate issued by a digital currency issuer and a second certificate issued by at least one digital currency operator; the first terminal device receives a third certificate sent by a first digital currency operator, and performs signature verification of the third certificate by using the second certificate, of which the signature verification passes, issued by the first digital currency operator, wherein the third certificate is generated by the first digital currency operator based on signature data of the first terminal device conducts the digital currency transaction with the first digital currency operator and/or a second terminal device, after the signature verification of the third certificate passes, wherein a fourth certificate sent by a second digital currency operator is stored in the second terminal device. Thereby, authentication and secure communication between the digital currency operator and the terminal device, and between different terminal devices can be realized, and therefore, security risks such as information theft, information leakage, illegal access, and so on, are avoided.

The above specific embodiments are not intended to limit the protection scope of the present disclosure. It should be understood by those skilled in the art that various modifications, combinations, sub combinations and alternations may be made depending on a design requirement and other factors. Any modification, equivalent substitution and improvement made within the spirit and principle of the present disclosure should be included in the protection scope of the present disclosure.

INDUSTRIAL APPLICABILITY

The solution in the embodiments of the present disclosure is applicable to the field of computer technology. In the embodiments of the present disclosure, the first terminal device stores a first certificate issued by a digital currency issuer and a second certificate issued by at least one digital currency operator. The first terminal device receives a third certificate sent by a first digital currency operator among the at least one digital currency operator, and performs signature verification of the third certificate by using the second certificate, of which the signature verification passes, issued by the first digital currency operator. Thereby, a purpose that the first terminal device conducts the digital currency transaction with the first digital currency operator and/or a second terminal device, after the signature verification of the third certificate passes, is achieved. In this way, an effect of authentication and secure communication between the digital currency operator and the terminal device, and between different terminal devices is realized. Therefore, security risks such as information theft, information leakage, illegal access, and so on, are avoided.

The invention claimed is:

1. A method for security authentication for a digital currency transaction, comprising:

storing, by a first terminal device, a first certificate issued by a digital currency issuer and a second certificate issued by at least one digital currency operator, wherein the digital currency operator and the second certificate are in one-to-one correspondence, and the first certificate is to perform signature verification of the second certificate by the first terminal device;

receiving, by the first terminal device, a third certificate sent by a first digital currency operator among the at least one digital currency operator, and performing, by the first terminal device, signature verification of the third certificate by using the second certificate, of which the signature verification passes, issued by the first digital currency operator, wherein the third certificate is generated by the first digital currency operator based on signature data of the first terminal device; and conducting, by the first terminal device, the digital currency transaction with the first digital currency operator and/or a second terminal device after the signature verification of the third certificate passes, wherein a fourth certificate sent by a second digital currency operator among the at least one digital currency operator is stored in the second terminal device.

2. The method according to claim 1, wherein the second certificate issued by the digital currency operator is generated by the digital currency issuer based on institution data of the digital currency operator, and is sent by the digital currency issuer to the digital currency operator, wherein the institution data comprises an institution identification.

3. The method according to claim 1, wherein before receiving, by the first terminal device, the third certificate sent by the first digital currency operator among the at least one digital currency operator, the method comprises:

signing, by the first terminal device, local data of the first terminal device to generate signature data of the first terminal device, wherein the local data of the first terminal device comprises a device identification of the first terminal device and a random number generated by the first terminal device; and sending, by the first terminal device, the signature data of the first terminal device to the first digital currency operator to generate the third certificate by the first digital currency operator based on the signature data of the first terminal device.

4. The method according to claim 3, wherein the step of conducting, by the first terminal device, the digital currency transaction with the first digital currency operator comprises:

encrypting, by the first terminal device, first business data of the digital currency transaction by using a first process key, and sending, by the first terminal device, the encrypted first business data to the first digital currency operator, to generate second business data of the digital currency transaction by the first digital currency operator based on the first business data;

receiving, by the first terminal device, encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator;

decrypting, by the first terminal device, the encrypted communication data to obtain the second business data, generating second digest information for the decrypted second business data, and performing signature verification of the digest information to obtain the first digest information; and comparing, by the first terminal device, the first digest information with the second digest information, performing a business processing on the second business data when the first digest information is consistent with the second digest information, and returning a processing result to the first digital currency operator.

5. The method according to claim 4, wherein the first process key is generated by each of the first terminal device and the first digital currency operator by:

determining a first shared confidential key through a key negotiation between the first terminal device and the first digital currency operator; and encrypting, by using the first shared confidential key, the device identification of the first terminal device and the random number generated by the first terminal device, to obtain the first process key.

6. The method according to claim 1, wherein the step of conducting, by the first terminal device, the digital currency transaction with the second terminal device comprises:

sending, by the first terminal device, the third certificate to the second terminal device, and receiving the fourth certificate sent by the second terminal device;

determining, by the first terminal device, the second digital currency operator from the at least one digital currency operator based on signature information in the fourth certificate; and performing, by the first terminal device, signature verification of the fourth certificate by using the second certificate, of which the signature verification passes, issued by the second digital currency operator.

7. The method according to claim 6, wherein the step of conducting, by the first terminal device, the digital currency transaction with the second terminal device further comprises:

encrypting, by the first terminal device, business data communicated in the digital currency transaction with the second terminal device by using a second process key, and sending, by the first terminal device, the encrypted business data to a counterpart terminal device, wherein the first terminal device and the second terminal device are counterpart terminal devices to each other, and wherein the second process key is generated by the first terminal device and the second terminal device by: determining a second shared confidential key through a key negotiation between the first terminal device and the second terminal device, and exchanging random numbers with each other; processing the random numbers of the first terminal device and the second terminal device according to a preset processing rule, to obtain a to-be-encrypted random number; and encrypting the to-be-encrypted random number by using the second shared confidential key, to obtain the second process key.

8. The method according to claim 1, wherein the first terminal device performs a local operation related to the digital currency transaction in a secure encryption chip, and the local operation comprises one or more of a process key generating operation, a data encryption operation, a data decryption operation, a signing operation, and a signature verification operation, wherein the process key is a first process key for conducting the digital currency transaction with the first digital currency operator, or a second process key for conducting the digital currency transaction with the second terminal device.

9. A system for security authentication of a digital currency transaction, comprising: a digital currency issuer server configured to issue a first certificate, at least one digital currency operator server configured to issue a second certificate, and a first terminal device, wherein the at least one digital currency operator server is configured to generate a third certificate based on signature data of the first terminal device, and generate a fourth certificate, and wherein the first terminal device is configured to:

store the first certificate and the second certificate, wherein the digital currency operator server and the second certificate are in one-to-one correspondence, and the first certificate is to perform signature verification of the second certificate by the first terminal device;

receive the third certificate from the digital currency operator server, and perform signature verification of the third certificate by using the second certificate, of which the signature verification passes, issued by the digital currency operator server; and conduct the digital currency transaction with the first digital currency operator server and/or a second terminal device after the signature verification of the third certificate passes, wherein the fourth certificate is stored in the second terminal device.

10. The system according to claim 9, wherein the second certificate issued by the digital currency operator server is generated by the digital currency issuer server based on institution data of the digital currency operator server, and is sent by the digital currency issuer server to the digital currency operator server, wherein the institution data comprises an institution identification.

11. The system according to claim 9, wherein before the first terminal device receives the third certificate from the digital currency operator server, the first terminal device is further configured to:

sign local data of the first terminal device to generate signature data of the first terminal device, wherein the local data of the first terminal device comprises a device identification of the first terminal device and a random number generated by the first terminal device; and send the signature data of the first terminal device to the digital currency operator server to generate the third certificate by the digital currency operator server based on the signature data of the first terminal device.

12. The system according to claim 9, wherein when the first terminal device conducts the digital currency transaction with the digital currency operator server, the first terminal device is further configured to:

encrypt first business data of the digital currency transaction by using a first process key, and send the encrypted first business data to the digital currency operator server, to generate second business data of the digital currency transaction by the digital currency operator server based on the first business data;

receive encrypted communication data and digest information signature sent by the digital currency operator server, wherein the encrypted communication data is obtained by encrypting the second business data by the digital currency operator server using the first process key, and the digest information signature is obtained by generating first digest information for the second business data and signing the first digest information by the digital currency operator server;

decrypt the encrypted communication data to obtain the second business data, generate second digest information for the decrypted second business data, and perform signature verification of the digest information to obtain the first digest information; and compare the first digest information with the second digest information, perform a business processing on the second business data when the first digest information is consistent with the second digest information, and return a processing result to the digital currency operator server.

13. The system according to claim 10, wherein each of the first terminal device and the digital currency operator server generates the first process key by:

determining a first shared confidential key through a key negotiation between the first terminal device and the digital currency operator server; and encrypting, by using the first shared confidential key, the device identification of the first terminal device and the random number generated by the first terminal device, to obtain the first process key.

14. The system according to claim 9, wherein when the first terminal device conducts the digital currency transaction with the second terminal device, the first terminal device is configured to:

send the third certificate to the second terminal device, and receive the fourth certificate sent by the second terminal device; and perform signature verification of the fourth certificate by using the second certificate, of which the signature verification passes, issued by the digital currency operator.

15. The system according to claim 12, wherein when the first terminal device conducts the digital currency transaction with the second terminal device, the first terminal device is configured to:

encrypt business data communicated in the digital currency transaction with the second terminal device by using a second process key, and send the encrypted business data to a counterpart terminal device, wherein the first terminal device and the second terminal device are counterpart terminal devices to each other, and wherein the second process key is generated by the first terminal device and the second terminal device by: determining a second shared confidential key through a key negotiation between the first terminal device and the second terminal device, and exchanging random numbers with each other;

processing the random numbers of the first terminal device and the second terminal device according to a preset processing rule, to obtain a to-be-encrypted random number; and encrypting the to-be-encrypted random number by using the second shared confidential key, to obtain the second process key.

16. The system according to claim 9, wherein the first terminal device performs a local operation related to the digital currency transaction in a secure encryption chip, and the local operation comprises one or more of a process key generating operation, a data encryption operation, a data decryption operation, a signing operation, and a signature verification operation, wherein the process key is a first process key for conducting the digital currency transaction with the first digital currency operator server, or a second process key for conducting the digital currency transaction with the second terminal device.

17. An electronic device, comprising:

one or more processors; and a memory, configured to store one or more programs, wherein the one or more programs, when executed by the one or more processors, cause the one or more processors to store, using a first terminal device, a first certificate issued by a digital currency issuer and a second certificate issued by at least one digital currency operator, wherein the digital currency operator and the second certificate are in one-to-one correspondence, and the first certificate is to perform signature verification of the second certificate by the first terminal device;

receive, using the first terminal device, a third certificate sent by a first digital currency operator among the at least one digital currency operator, and perform, using the first terminal device, signature verification of the third certificate by using the second certificate, of which the signature verification passes, issued by the first digital currency operator, wherein the third certificate is generated by the first digital currency operator based on signature data of the first terminal device; and conduct, using the first terminal device, the digital currency transaction with the first digital currency operator and/or a second terminal device after the signature verification of the third certificate passes, wherein a fourth certificate sent by a second digital currency operator among the at least one digital currency operator is stored in the second terminal device.

18. The electronic device according to claim 17, wherein before receiving, using the first terminal device, the third certificate sent by the first digital currency operator among the at least one digital currency operator, the one or more programs, when executed by the one or more processors, further cause the one or more processors to:

sign, using the first terminal device, local data of the first terminal device to generate signature data of the first terminal device, wherein the local data of the first terminal device comprises a device identification of the first terminal device and a random number generated by the first terminal device; and send, using the first terminal device, the signature data of the first terminal device to the first digital currency operator to generate the third certificate by the first digital currency operator based on the signature data of the first terminal device.

19. The electronic device according to claim 17, wherein when conducting, using the first terminal device, the digital currency transaction with the first digital currency operator, the one or more programs, when executed by the one or more processors, further cause the one or more processors to:

encrypt, using the first terminal device, first business data of the digital currency transaction by using a first process key, and send, using the first terminal device, the encrypted first business data to the first digital currency operator, to generate second business data of the digital currency transaction by the first digital currency operator based on the first business data;

receive, using the first terminal device, encrypted communication data and digest information signature sent by the first digital currency operator, wherein the encrypted communication data is obtained by encrypting the second business data by the first digital currency operator using the first process key, and the digest information signature is obtained by generating first digest information for the second business data and signing the first digest information by the first digital currency operator;

decrypt, using the first terminal device, the encrypted communication data to obtain the second business data, generating second digest information for the decrypted second business data, and performing signature verification of the digest information to obtain the first digest information; and compare, using the first terminal device, the first digest information with the second digest information, performing a business processing on the second business data when the first digest information is consistent with the second digest information, and returning a processing result to the first digital currency operator.

20. A non-transitory computer-readable storage medium having a computer program stored thereon, wherein the computer program, when executed by a processor, performs the method according to claim 1.

\* \* \* \* \*